INVENTOR
MICHAEL J. DITORO
BY
Ernest Fenwick
ATTORNEY

INVENTOR
MICHAEL J. DITORO
BY Ernest Fanwick
ATTORNEY

Dec. 12, 1961 M. J. DI TORO 3,013,212

AURAL DETECTION APPARATUS COMPRISING AN ACOUSTICAL DELAY LINE HAVING EXTERNAL FEEDBACK CIRCUIT

Filed Aug. 28, 1953 3 Sheets-Sheet 3

INVENTOR
MICHAEL J. DITORO

BY Ernest Fanwick

ATTORNEY

United States Patent Office 3,013,212
Patented Dec. 12, 1961

3,013,212

AURAL DETECTION APPARATUS COMPRISING AN ACOUSTICAL DELAY LINE HAVING EXTERNAL FEEDBACK CIRCUIT

Michael J. Di Toro, Massapequa, N.Y., assignor to International Telephone and Telegraph Corporation, a corporation of Maryland Filed Aug. 28, 1953, Ser. No. 377,213
13 Claims. (Cl. 328—137)

This invention relates to apparatus for the aural detection of a tone having an unknown frequency which is immersed in noise and more particularly to apparatus utilizing a comb filter for improving the aural detection of a tone.

The operator of sound location equipment, such as sonar, faces the problem of detecting a tone signal having a narrow frequency bandwidth which is immersed in random or white noise when the tone frequency is not known in advance. However, even though the frequency of the tone is not known in advance the extent of uncertainty of the signal or tone frequency is always limited to a particular frequency band of interest.

It is an object of this invention to provide apparatus which will enhance the ability of the naked ear to detect a tone having a narrow bandwidth of unknown frequency when the tone is immersed in noise, such apparatus utilizing a comb filter.

Another object of this invention is to provide a novel type of comb filter utilizing an acoustical delay line with external feedback.

A feature of this invention is the use of a comb filter comprising an acoustical delay line and an external electrical feedback circuit, in conjunction with a spectrum translating modulator which allows the pass bands of the comb filter to scan the entire spectrum during a short interval of time and then utilizes the physiological characteristics of the human ear to detect the presence of a tone anywhere in the scanned frequency spectrum.

The above-mentioned and other features and objects of this invention will become more apparent by reference to the following description taken in conjunction with the accompanying drawings, in which.

The property of the human ear by virtue of which a tone may be detected in a wideband of noise, independent of noise outside of a narrow frequency band around the tone, has been formulated as the concept of critical bandwidth. The critical bandwidth is that portion of the frequency spectrum on either side of a tone of a given frequency, outside of which noise is ineffective in masking tthe tone. The critical bandwidth of the human ear varies in width dependent upon the portion of the frequency spectrum in which the tone lies. Thus if the frequency of the tone is approximately 500 cycles per second (c.p.s.) the critical bandwidth is 35 c.p.s. but when the tone frequency is 3000 c.p.s. the critical bandwidth is 100 c.p.s.

Figure 1:
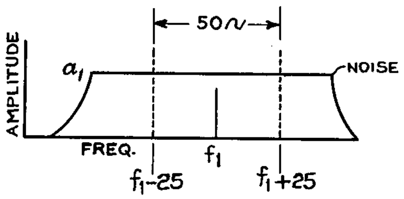
FIGS. 1 and 2 are graphic illustrations helpful in explaining the critical bandwidth characteristics of the human ear.

Referring to FIG. 1, it is assumed that the critical bandwidth of the human ear at a given frequency $f_1$ is 50 c.p.s. and extends between the frequencies $f_1-25$ and $f_1+25$. All noise energy outside the critical bandwidth (i.e. below $f_1-25$ and above $f_1+25$) is ineffective in masking the tone at frequency $f_1$ and the aural threshold level of the tone at frequency $f_1$ is dependent solely upon the noise energy present within the critical bandwidth between $f_1-25$ and $f_1+25$.

Figure 2:
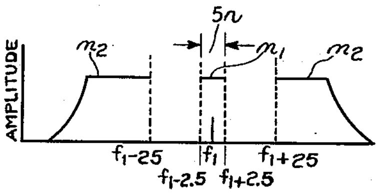

FIGURE 2 is a graphical representation of the noise energy present in the frequency spectrum around a tone $f_1$ being filtered by a filter whose bandpass is narrower in bandwidth than the critical bandwidth of the human ear. The filter is assumed to have a bandpass of 5 c.p.s. surrounding the tone at $f_1$ and it is seen that the noise power within the limits ($f_1-25$ and $f_1+25$) of the critical bandwidth of the ear decreases directly with the filter bandwidth, i.e., only that noise $n_1$ within the bandpass limits of the filter can effect the aural threshold level of the ear for a tone at a given frequency. As explained above noise power outside the critical bandwidth limits does not affect the threshold level. Thus, as shown in FIGURE 2, a tone $f_1$ of the same frequency but having a smaller amplitude than that shown in FIGURE 1, can be detected by the ear if it is first passed through a narrow bandpass filter which effectively decreases the threshold level of the ear for the tone.

In sound locating devices, such as sonar, it is necessary to monitor a relatively wide frequency spectrum for the presence of a tone radiated by a target, when the frequency of the tone is unknown. Under such circumstances the impracticability of utilizing a single narrow band filter is readily apparent. If one allows three seconds for listening in each 5 c.p.s. band it would require 30 minutes to search a frequency band extending from 0 to 3000 c.p.s.

The ear not only has the ability to eliminate noise as a masking factor outside of a critical bandwidth, but simultaneously monitors the spectrum for the presence of a tone in any critical bandwidth and because tones at a given frequency are not masked by noise at remote frequencies (outside the ear's critical bandwidth), the ear may be used to simultaneously monitor a large number of spaced narrow bandpass filters for the presence of narrow band signal tones. By utilizing a plurality of narrow bandpass filters the time necessary to search a given frequency spectrum is reduced by a factor equal to the number of filters utilized.

Figure 3:
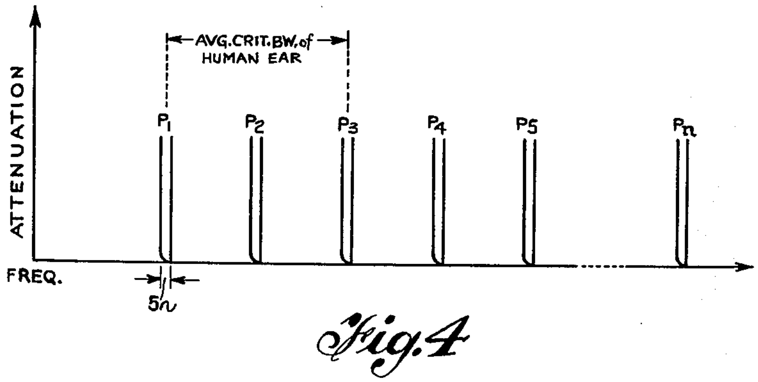
FIG. 3 is a graph of frequency versus attenuation to show the frequency characteristics of a typical comb filter.

Referring to FIG. 3 the attenuation vs. frequency characteristics of a comb filter is shown. It is apparent that the multiple pass bands $P_1, P_2 \ldots P_n$ or "teeth" of the comb filter are the equivalent of a plurality of spaced narrow bandpass filters. The spacing between adjacent pass bands or "teeth" of the comb filter is constant over the entire frequency spectrum and so arranged that there is no appreciable masking of a signal in one pass band by noise in adjacent pass bands by allowing each pass band to fall in the center of one of the assumed critical bandwidths of the ear. The comb filter, as applied to the aural detection of tones of uncertain frequency, is used to achieve the reduced threshold's position within the pass band of narrow filters without an excessive increase in search time occasioned by the use of a single narrow bandpass filter or the increased mechanical complexity occasioned by the use of a plurality of single filters. Since the critical bandwidth of the ear varies with frequency while the spacing between teeth of the comb filter is constant an average critical bandwidth must be selected as the spacing for the teeth of the comb filter. A comb filter with pass bands spaced at one-half the average critical bandwidth of the ear is a practicable filter for use with my invention and should give aural threshold improvement of at least 6 db for any tone within the frequency spectrum of interest when the pass bands are approximately 5 c.p.s.

The choice of intertooth spacing is a compromise between maximum signal-to-noise improvement and minimum scanning time, since placing the teeth closer together to reduce the scanning time eventually results in a mutual masking. Where the critical bandwidth is 50 c.p.s., spacing of 25 c.p.s. between the teeth is adequate since it places each tooth in the center of a 50 c.p.s. band, but where the critical bandwidth is wider, as above 600 c.p.s., spacing as little as 25 c.p.s. would cause some masking; therefore, 31 c.p.s. spacing is a satisfactory compromise for the comb filter of this invention.

It is desirable to space the bandpass of the filter at 31 c.p.s. so that each pass band is in the center of an average critical bandwidth of noise and adjacent bands are just remote enough not to mask each other. By so having this spacing the time for scanning the entire frequency spectrum is reduced. For example, if each pass band of the filter is 5 c.p.s. wide and it is desired to monitor its output for three seconds it will take 18.6 seconds to scan the entire spectrum (i.e. 31 c.p.s. spacing divided by 5 c.p.s. filter width times the number of seconds listening at each 5 c.p.s.).

Any circuit having an impulse response consisting of equally spaced impulses will have a frequency response consisting of equally spaced pass bands and thus be suitable for use as a comb filter. It is well-known that a delay medium or electric signal delay line with reflections at the input and output ends will have an impulse response and act as a comb filter. An acoustical comb filter previously known depends on multiple acoustic reflection within a pipe acting as a delay medium to provide the proper impulse response. Dissipation was kept as small as possible and the effective length of the filter was twice the physical length of the pipe. I have found that an acoustical delay medium without such reflections but with external feedback is more effective since it is not limited by losses in the delay network and an acoustical delay line of smaller diameter may be used.

Figure 4:
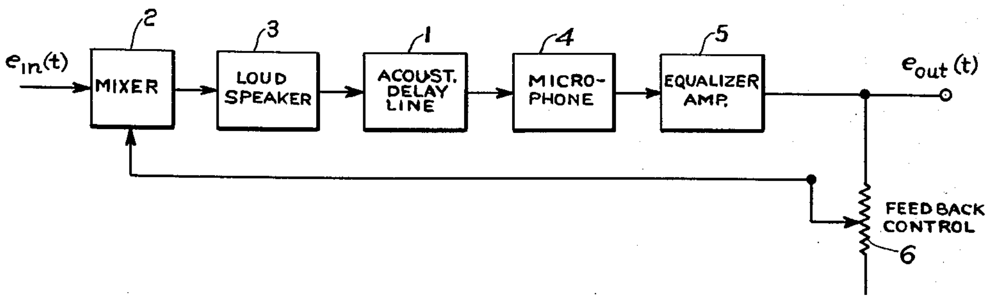
FIG. 4 is a schematic diagram in block form of one embodiment of a comb filter for use with this invention.

Referring to FIG. 4 of the drawing, a schematic diagram in block form of the circuit of the delay line and external feedback loop utilized in the acoustical comb filter of this invention is shown. The comb filter is synthesized by using an acoustical delay line 1. Input signal frequencies $e_{in}(t)$ are coupled through a mixer circuit 2 to a loudspeaker 3 whose output is coupled to the delay line 1. The delayed audio output of line 1 is picked up by a microphone 4 and fed to an equalizer amplifier circuit 5. A portion of the output of amplifier 5 is fed back through a feedback control 6 to the mixer 5 to form a part of the input signal frequencies to delay line 1.

The comb effect of the filter is the result of using the acoustic delay line 1 and the external feedback arrangement. The chief factors in the design of a comb filter are the spacing between teeth, the bandwidth of the teeth and the search time allowed. Signal frequencies which are fed back to the input of the delay line are in phase with incoming signals only for those frequencies which are integral multiples of $$\frac{1}{T}$$

where T is the delay time of the line resonant peaks are established at those frequencies. The bandwidth of the teeth is determined by the net circuital gain around the feedback loop. If the time delay of line 1 is made to equal approximately 32.2 milliseconds the resulting spectral response is a series of teeth 31 c.p.s. apart which is selectively determined by the net circuital gain around the feedback loop. The delay distance is so chosen that each filter pass band lies substantially in the center of one of the ear's critical bandwidths. The peak to valley response of the filter is equal to $$\frac{1+a}{1-a}$$

where $a$ is the net circuital gain mentioned above. It may be desirable to reduce the peak to valley ratio of the comb filter when wide band sounds are also to be heard through the comb filter.

Since a high peak to valley ratio is equivalent to having a narrow pass band, the bandwidth and hence the energy of the noise in the band is reduced proportionally and a tonal signal at the center of the band will experience no reduction in magnitude and the signal-to-noise ratio for that tone is improved. The improvement expected is 3 db for each octave decrease in bandwidth. At the same time, however, there results an increase in the fluctuations of the noise present in the band causing a decrease in detectability. The net improvement found experimentally is only 2 db per octave. While the bandwidth I tentatively decided upon is 5 c.p.s. for a peak to valley ratio of 14.9 db, a feedback control 6 is introduced to permit adjustment. Provision may also be included for adding some of the input to the output of the delay line which would permit a reduction of the peak to valley ratio while maintaining a constant bandwidth. It should again be pointed out that the comb response is dependent on the gain in the feedback loop which makes it essential to maintain amplitude stability and for this reason a voltage regulated power supply is desirable along with considerably negative feedback being introduced into an amplifier which may be placed in the feedback loop.

The bandwith of the individual teeth should be made as narrow as possible to effect the maximum signal-to-noise improvement subject also to limitations imposed by scanning time. Experiments have shown that a minimum of 3 seconds should be allowed for detection of a tone in each part of the spectrum so that approximately 18 seconds are required to scan a frequency band with teeth 5 c.p.s. in bandwidth and intertooth spacing of approximately 31 c.p.s. In the comb filter of this invention the bandwidth was made adjustable, down to 2 c.p.s. over part of the spectrum by adjusting the amount of feedback. The gain in the feedback loop can be increased to where it is close to unity and the system goes into oscillations. I have found that an appropriate acoustical delay line in accordance with this invention comprises copper tubing ¾ inch in diameter and 37½ feet long which can be coiled into a cylinder 12 inches high and 12½ inches in diameter to provide the acoustical delay line. At 20° C. ambient operating temperature the line provides a 32.2 millisecond delay which is the equivalent of 1/.032 or 31 c.p.s. spacing. The final coiled shape of the acoustical delay line may be potted to reduce acoustical radiation and pickup, Of course it should be understood that the factors involved in the choice of pipe length and diameter, transducers and frequency range of operation depend upon the ultimate use of the comb filter.

I have attempted to make the two-way attenuation in the delay line 1 so great that reflections are of negligible amplitude and to depend upon the external feedback which is applied electrically to increase the effective length of the pipe until it is equal to the physical length of the pipe. However since the acoustical attenuation in the pipe varies exponentially as a function of frequency the output must be equalized by using an equalizer amplifier 5. For a given bandwidth the amount of equalization (the difference in attenuation at the extreme ends of the frequency band) is less at high frequencies than at low frequencies. On the other hand the amount of attenuation in the pipe becomes prohibitive at very high frequencies. I have found that using an input frequency band to the acoustical delay line of 4–8 kilocycles results in a satisfactory compromise. Input signal frequencies may be heterodyned to this range by a signal translating modulator hereinafter described. Scanning of the frequency spectrum is accomplished by shifting the spectrum back and forth before the filter.

Figures 5, 7:
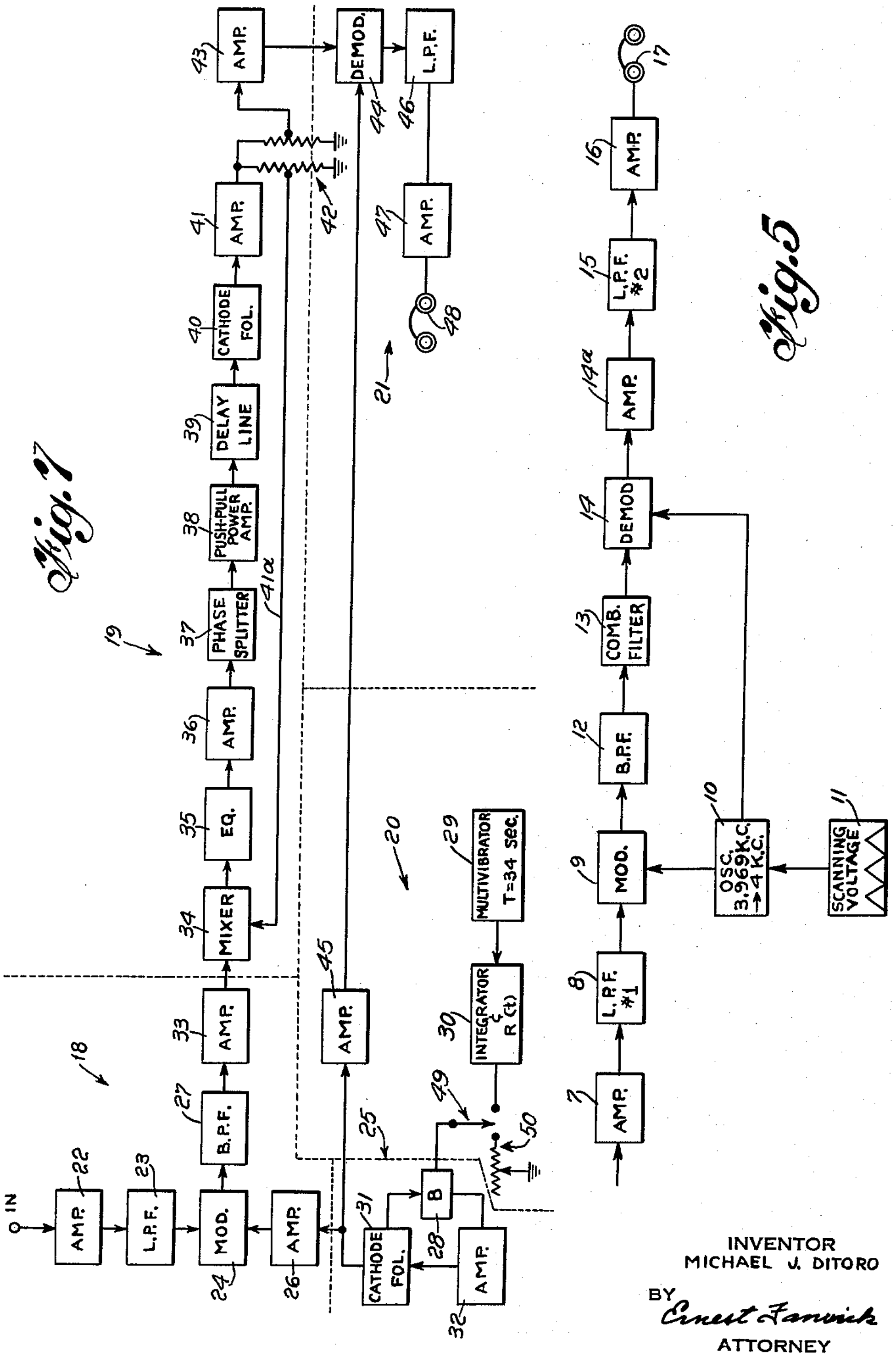
FIG. 5 is a schematic diagram in block form of one embodiment of the aural detection equipment in accordance with the principles of this invention.
FIG. 7 is a schematic diagram in block form of another embodiment of the aural detection equipment of this invention.
Figure 6:
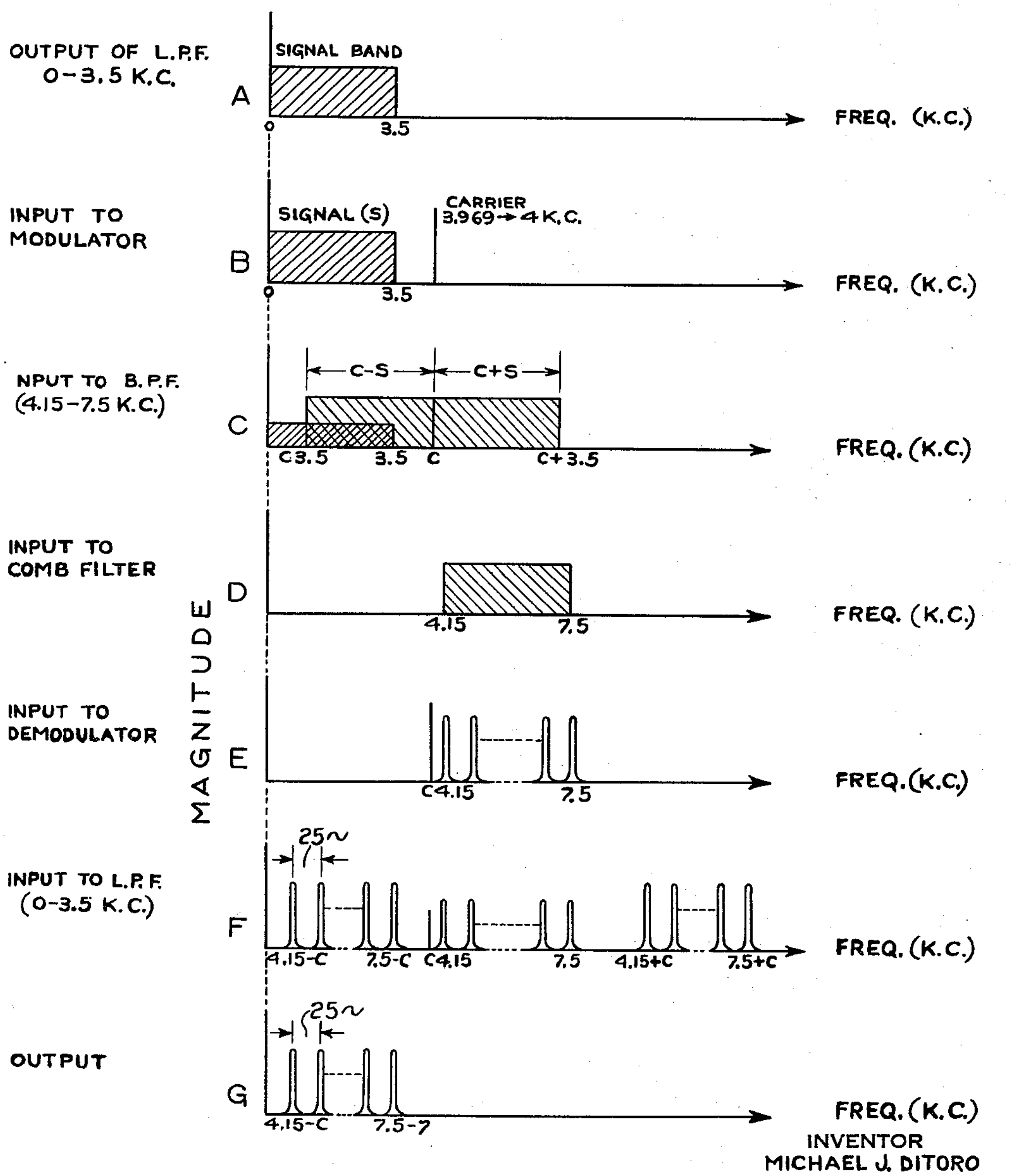
FIG. 6 is a graphic representation of the waveforms present in the equipment shown in FIG. 5.

Referring to FIG. 5 the aural detection apparatus in accordance with the principles of this invention is shown. For purposes of clarity in explanation it is assumed that the frequency spectrum extending from 200 c.p.s. to 3500 c.p.s. is to be monitored for the presence of a tone signal having an unknown frequency. The input spectrum 200–3500 c.p.s. is coupled to an amplifier 7 whose output is filtered by a low pass filter 8 which eliminates all signals having a frequency above the spectrum of interest i.e. above 3500 c.p.s. As shown in FIG. 6, curve A, the output of the low pass filter 8 comprises all the energy below 3500 c.p.s. The output of filter 8 is coupled to the modulator 9 of a spectrum translating modulator circuit. The filtered input spectrum energy is modulated in circuit 9 with a variable carrier from oscillator 10. This modulation shifts the input spectrum to the frequency range of the comb filter. In order to scan the input spectrum in front of the comb filter a variable carrier from oscillator 10 is utilized. The speed of scanning is dependent upon the output of a scanning voltage generator 11 which is coupled to oscillator 10. Since the pass bands of the comb filter are 31 c.p.s. apart, this is the maximum frequency excursion required in the variable oscillator whose output varies from 4000 c.p.s. to 3969 c.p.s. Thus as shown in FIG. 6, curve B, the input to the modulator 9 comprises the output of the low pass filter 8 and the variable carrier frequency from oscillator 10. The output of modulator 9, as shown in FIG. 6, curve C, comprises the spectrum from 0–3500 c.p.s. as well as the modulation products extending from the carrier frequency C minus the input spectrum S to the carrier frequency C plus the input spectrum S. This energy is coupled through a band pass filter 12 which passes the energy of the upper sideband extending from 4200 to 7500 c.p.s. which is the frequency range of the comb filter 13. The output of the filter 12, as shown in FIG. 6, curve D, is coupled to the acoustical comb filter 13. The output of the comb filter 13, as shown in FIG. 6, curve E, is coupled to a demodulator 14 along with the variable frequency carrier from oscillator 10. The demodulator 14 output after being amplified in circuit 14_a_ is passed through a low pass filter 15 where the upper demodulation signal products are passed to amplifier 16 and thence to a transducer such as a pair of earphones 17.

Referring to FIG. 7 of the drawing a schematic diagram in block form of another embodiment of the aural detection apparatus of this invention is shown to include an input circuit 18, acoustical comb filter circuit 19, an oscillator circuit 20 and an output circuit 21. The frequency spectrum to be monitored is coupled through an amplifier 22 and low pass filter 23 to a modulator 24 which receives the input spectrum of interest in a manner similar to the equipment 7–9, shown in FIG. 5. The function of the spectrum translating modulator 24 is to shift the input spectrum to the frequency range of the comb filter, and to scan the input spectrum back and forth before the teeth of the comb filter so that a tone in the input is certain to fall in one of the pass bands of the filter during part of the scanning cycle. This is accomplished by modulating a variable frequency carrier (operating between 3969 c.p.s. and 4000 c.p.s.) with the input spectrum, selecting the upper sideband and demodulating with the same carrier after passage through the comb filter.

The modulation frequency from the variable oscillator 25 undergoes a periodic 31 c.p.s. shift so that the translated signal band is also shifted. The modulation frequency is coupled from oscillator 25 through an amplifier 26 to modulator 24 whose output is filtered by a band pass filter 27. The signal frequencies in the region below 3.6 kc. are translated by 4 kc. in the double-balanced modulator 24 the output of which consists of the upper and lower sidebands, $C+S$ and $C-S$, plus distortion products. A bandpass filter 27 around the upper sideband transmits the frequencies in $C+S$ while considerably attenuating the residual carrier leak and the lower sideband. Any other modulation products such as $3C+3S$, $3C+5S$, etc., appearing in this pass band cannot be filtered and will also appear in the output. The choice of modulation frequency was selected because the bandpass filter 27 for the suppression of the lower sideband in the output of modulator 24 requires a sharper cutoff at higher frequencies and hence greater complexity. Also the attenuation in the acoustical delay line is greater at high frequencies thereby minimizing the possibility of multiple reflections within the pipe. The feedback is then only external to the pipe and is therefore instantaneous and of a controllable magnitude. In addition, the outputs of the double-balanced modulator contain products of the form $NC\pm NS$ where N is an odd integer, C and S being the carrier and signal frequencies. The largest of these, other than $C\pm S$ were found to be $3C\pm 3S$ and $3C\pm 5S$ with amplitudes of at most 17 db below $C+S$. It is conceivable that for certain signal frequencies, that high order products would fall in the band covered by $C+S$. On the demodulation there would be additional components at the frequencies corresponding to this overlap. A choice of 4 kc. for a modulation frequency does not introduce an undue amount of this type of distortion. As an example of this type of distortion, a 1 kc. tone modulated at 4 kc. would be shifted to 5 kc. and also to 12−5(1) equals 7 kc. although at a smaller amplitude. The other products fall outside of the band from 4–7.5 kc. and are not passed through the bandpass filter. The product of 7 kc. coincides with the modulation product of a 3 kc. tone. Demodulation at 4 kc. brings the 1 kc. tone from 5 kc. back to 1 kc. and produces another tone at 3 kc. in the output.

The scanning operation of varying the modulation frequency so that any input frequency $f$, will, after translation, fall between $3969+f$ and $4000+f$ and in so doing will pass through one of the sharply tuned pass bands of the comb filter. The carrier or modulation voltage is generated by the variable frequency phase shift oscillator 25 and the frequency is determined by the components of a phase shift network 28. A free-running multivibrator 29 generates a 1/30 c.p.s. square wave which is transformed into a triangular waveform by a Miller integrator 30 and the output of the integrator 30 is coupled through a switch 49 to eventually vary the grid voltage and thus the conductance of a cathode follower 31. The triangular waveform takes 30 seconds to complete a full cycle so that the spectrum is actually scanned in 15 seconds (giving 3 seconds listening time in each 5 c.p.s. band). Since the output impedance of the cathode follower 31 is a function of its conductance there results a time variation of resistance. By a proper choice of operating points a linear variation of impedance with time can be obtained. Since it is desired that the output appear in each 5 c.p.s. band of the spectrum under observation with equal time, good linearity is essential and a simple means of maintaining the frequency variation constant over the carrier modulation frequency range is important. The amplifiers and filters are of the conventional types and will be readily understood by those skilled the art. The oscillator may be of the resistance-capacitance phase shift type, the temperature coefficient of the capacitors being so chosen to tune the negative temperature coefficient of the precision resistors in the phase shift network 28 in order to achieve a long-time frequency stability. The modulator and demodulator circuits are of the balanced bridge type.

The output of the amplifier 33 is coupled to the mixer 34 and then to equalizer 35. The equalizer 35 performs the same function as the equalizer 5 shown in FIG. 4. The output of the equalizer 35 is amplified in circuit 36 and coupled through a phase splitter 37 which drives a push-pull power amplifier 38 which has its output coupled to the acoustical delay line 39. The output of the delay line 39 is passed through the cathode follower 40 and amplifier 41 to the feedback control 42 where the external feedback is coupled to the mixer 34 over line 41*a*. The output from the comb filter is coupled through amplifier 43 to demodulator 44 where it is modulated with the variable carrier frequency from oscillator 25 after it has been amplified in circuit 45. The demodulation results in upper and lower sidebands which are removed from each other by a simple low pass filter 46 which passes the output to an amplifier 47 which is coupled to the utilizing equipment such as earphones 48. It should be understood that it is also possible to do the comb filtering at a lower frequency range without heterodyning but the upper frequency range is advantageous because the acoustical delay line will pick up less noise at the higher frequencies.

Switch 49 and resistor 50 are provided for manual scanning control if it is desired to vary the time of listening in each bandpass of the filter instead of the automatic scanning control provided by the multivibrator and integrator.

While I have described above the principles of my invention in connection with specific apparatus, it is to be clearly understood that this description is made only by way of example and not as a limitation to the scope of my invention as set forth in the objects thereof and in the accompanying claims.

I claim:

1. A comb filter having an output frequency response of a plurality of spaced pass bands comprising an acoustical delay line including input and output terminals, means to couple an input signal to the input of said acoustical delay line and means including an amplifier external to said acoustical delay line to feed back a portion of the output of said delay line to the input of said line.

2. A comb filter having an output frequency response of a plurality of spaced pass bands comprising an acoustical delay line including input and output terminals, input transducer means coupled to said input terminals to convert input electrical energy into sound energy, output transducer means coupled to said output terminals to convert sound energy output of said delay line into electrical output energy, and means including an amplifier external to said delay line to feed back a portion of said electrical output energy to said input transducer means.

3. A comb filter according to claim 2, wherein said means to feedback a portion of said output electrical energy further includes means including a variable resistance to vary the amount of said portion.

4. A comb filter according to claim 2, which further includes means to mix said input electrical energy with said fedback portion of output electrical energy.

5. A comb filter according to claim 2, which further includes means to compensate for the unequal response of said acoustical delay over a wide range of frequencies.

6. A comb filter having an output frequency response of a plurality of spaced pass bands comprising an acoustical delay line including input and output terminals, means to convert an input electrical signal having a wide frequency band into sound energy, means to couple said sound energy to the input of said delay line, means to convert the output of said delay line into electrical output energy, and means including an amplifier to feed back a portion of said electrical output energy to mix with said input electrical energy.

7. Apparatus for detecting a signal tone of unknown frequency within a given frequency spectrum comprising a filter capable of passing a plurality of frequency bands at spaced intervals, said intervals being equal substantially to one half the average critical bandwidth of the human ear and each of said bands being substantially narrower than the average critical bandwidth of the human ear, means to cause said frequency spectrum to be scanned past said pass bands and means for coupling the output of said filter to aural apparatus.

8. Apparatus according to claim 7, wherein said means to cause said frequency spectrum to be scanned past said pass bands includes a variable oscillator having a frequency excursion equal to said interval and means to modulate said given frequency spectrum with the output of said oscillator.

9. Apparatus for detecting a signal tone of unknown frequency within a given frequency spectrum comprising a filter capable of passing a plurality of frequency bands each substantially narrower than the average critical bandwidth of the human ear, within a predetermined frequency range, at spaced intervals equal substantially to one half the average critical bandwidth of the human ear, a variable oscillator having a frequency excursion equal substantially to said interval, means to heterodyne said given frequency spectrum by the output of said oscillator to said predetermined frequency range, means to couple said heterodyned signal to the input of said filter, means to demodulate the output of said filter by the output of said oscillator and to couple the output of said filter to aural apparatus.

10. Apparatus according to claim 9, wherein said filter comprises an acoustical delay line including input and output terminals, means to couple an input signal to the input of said acoustical delay line and means external to said acoustical delay line to feed back a portion of the output of said delay line to the input of said line.

11. Apparatus according to claim 9, which further includes means to control the time rate of variation in the output of said oscillator.

12. Apparatus according to claim 9, which further includes band pass filter means to attenuate the undesirable side modulation components in the output of said heterodyning means.

13. Apparatus according to claim 9, which further includes means to equalize substantially the response of said filter to energy at different frequencies within said given frequency spectrum.

References Cited in the file of this patent

UNITED STATES PATENTS

| | | |
|---|---|---|
| 2,530,693 | Green | Nov. 21, 1950 |
| 2,560,806 | Lewis | July 17, 1951 |
| 2,596,460 | Arenberg | May 13, 1952 |
| 2,773,244 | Grieg | Dec. 4, 1956 |